United States Patent

[11] 3,573,661

[72] Inventor Dean E. McCumber
Summit, N.J.
[21] Appl. No. 753,955
[22] Filed Aug. 20, 1968
[45] Patented Apr. 6, 1971
[73] Assignee Bell Telephone Laboratories, Incorporated
Murray Hill, N.J.

[54] SNS SUPERCURRENT JUNCTION DEVICES
14 Claims, 10 Drawing Figs.

[52] U.S. Cl. .......... 331/107, 307/277, 307/306
[51] Int. Cl. .......... H03k 3/38
[50] Field of Search .......... 331/107, 107 (S); 307/245, 277, 306

[56] References Cited

OTHER REFERENCES

DeGennes, Reviews of Modern Physics, Jan. 1964, pp. 225–237. (331-107S).
Lumpkin, IBM Technical Disclosure Bulletin, Vol. 10, No. 5, Oct. 1967, p. 679. (331-107S).
Meyers, IBM Technical Disclosure Bulletin, Vol. 4, No. 7, Dec. 1961, p. 94. (331-107S).

*Primary Examiner*—Roy Lake
*Assistant Examiner*—Siegfried H. Grimm
*Attorneys*—R. J. Guenther and Arthur J. Torsiglieri

ABSTRACT: A supercurrent device includes a superconductor-normal metal-superconductor (SNS) structure which has a current-voltage characteristic analogous to that of Josephson tunnel junctions but relies on a proximity effect rather than tunneling. Several devices employing the SNS structure are disclosed: a basic cryogenic switch or logic device, pulse generators and parametric devices.

Patented April 6, 1971 3,573,661

3 Sheets-Sheet 1

INVENTOR
D. E. Mc CUMBER
BY
Arthur J. Torsiglieri
ATTORNEY

SNS SUPERCURRENT JUNCTION DEVICES

BACKGROUND OF THE INVENTION

This invention relates to cryogenic devices, and more particularly to supercurrent devices which have characteristics analogous to those of Josephson tunnel junction devices.

In a paper entitled "Possible New Effects in Superconductive Tunneling," published in the Jul. 1, 1962 issue of Physics Letters, pages 251 to 252, D. B. Josephson predicted theoretically that a supercurrent would flow between two superconductors separated by a thin insulating barrier (i.e., an SIS supercurrent tunnel junction) by a mechanism known as two-particle superconducting tunneling. This effect has been observed and reported by P. W. Anderson and J. M. Rowell in a paper entitled "Probable Observation of the Josephson Superconducting Tunneling Effect" and published in the Mar. 15, 1963 issue of Physical Review Letters, pages 230 to 232.

Other geometries exhibit the supercurrent phenomenon but are not limited to two-particle tunneling. P. W. Anderson and A. H. Dayem describe in Physical Review Letters 13, 195 (1964 ) a superconducting bridge which has some effects similar to those observed in the planar SIS Josephson structure. In U. S. Pat. application Ser. No. 561,624, filed on Jun. 29, 1966 (now U.S. Pat. No. 3,423,607) and assigned to applicant's assignee, J. E. Kunzler et al. teach the existence of supercurrents in point contact structures.

In general, the supercurrent devices comprise an interfacial region between a pair of superconductive regions. As pointed out in the previous examples, the interfacial region may be formed in a variety of geometries including planar SIS, point contact, and bridge-type structures. The interfacial region in each of the above cases is a weak-link region interconnecting the superconductive regions, the weak link breaking down when a critical current is exceeded. The weak link is the thin insulator in the SIS structure, the region of contact in the point contact structure, and the region of minimum cross-sectional area in the bridge structure.

Each of these structures exhibits effects analogous to, but not limited to, the Josephson two-particle tunneling effect: When the current through the structure is increased from zero, the voltage across the interface remains zero over a range of current below a first critical supercurrent designated $i_J$. When the current flow through the interface exceeds the first critical supercurrent, the voltage across the interface abruptly increases to some finite value. Furthermore, when the current is reduced from above to below the first critical supercurrent, the voltage across the interface remains finite until a second critical supercurrent, termed the switchback current and designated $i_o$, is reached whereupon the interface voltage again drops to zero.

SUMMARY OF THE INVENTION

In accordance with an illustrative embodiment of the present invention, the interfacial weak-link region between a pair of superconductors comprises a normal metal layer thus forming a superconductor-normal metal-superconductor (SNS) structure which in geometrical configuration may be planar, point- contact or any other suitable geometry.

The current-voltage characteristic of the SNS structure is analogous to that of the Josephson tunnel junction, being characterized by first and second zero voltage finite value critical currents $i_J$ and $i_o$ as previously described. The fundamental atomic mechanism which create this characteristic is related, however, to a proximity effect and not to a tunneling effect.

The proximity effect can be explained in terms of electron coherence which postulates that in a superconductor electron pairs are bound to each other by a transfer of phonons in the lattice of the superconductor. When such an electron pair is injected into the normal metal layer, the electrons are no longer bound by phonons but nonetheless electron coherence persists in the normal metal over a distance termed the electron coherence length. Over the coherence length the electron wave-function phase relationship necessary to a supercurrent still obtains. At distances beyond the coherence length, the special electron phase relationship no longer occurs and the supercurrent ceases. It is therefore desirable that, in order to achieve supercurrents in an SNS structure, that the thickness $t$ of the normal metal layer be preferably (though not necessarily) less than or equal to the electron coherence length $\xi$; that is, $$t \lesssim \xi = \left(\frac{\hbar v_F}{2[(\pi k_B T)^2 + \Delta_1\Delta_2]^{1/2}}\right)^{1/2} \Bigg/ \left\{\left(\frac{3}{l}\right)^{1/2} + \left(\frac{2[(\pi k_B T)^2 + \Delta_1\Delta_2]^{1/2}}{\hbar v_F}\right)^{1/2}\right\} \quad (1)$$

where $\Delta_1$ and $\Delta_2$ are the respective energy gaps in the two superconductors at the normal-metal interfaces, $T$ is the temperature of the device, $k_B$ is Boltzmann's constant, $\hbar$ is Planck's constant divided by $2\pi$, $V_F$ is the Fermi velocity of electrons in the normal metal, and $l$ is the electron mean free path in the normal metal. The critical supercurrents $i_J$ and $i_o$ are a function of the thickness $t$; that is, as $t$ increases both $i_J$ and $i_o$ decrease.

Notwithstanding this limitation, which is not critical, the thickness of the normal metal layer (e.g., bismuth or copper) in an SNS structure may advantageously be of the order of 100 to 1000 A., whereas the requirement of tunneling in Josephson SIS structures restricts the thickness of the insulative layer to about 10 A. The orders of magnitude improvement in thickness of the interfacial region in SNS devices means that such devices are less sensitive to variations in the fabrication process and less susceptible to superconductor-to-superconductor short circuits.

A second advantage of SNS structures arises from the higher conductance inherent in the normal metal as compared the extremely low conductance of insulators used in SIS devices. It is well known that supercurrent structures can be used as cryogenic switches or as a variety of logic devices. See, for example, U.S. Pat. No. 3,281,609 issued to J. M. Rowell on Oct. 25, 1966, assigned to applicant's assignee and directed to superconducting tunnel junctions exhibiting the Josephson effect. The ability of supercurrent devices to perform properly such functions is hampered by two factors not accounted for in the prior art devices, especially the Josephson SIS tunnel junction. First, the switchback current $i_o$ is generally a random value sensitive to ambient noise and typically very close to zero. Consequently, to return the device from the finite-voltage state to the zero-voltage state, it is necessary in the prior art to decrease the current from $i_J$ to nearly zero in order to insure that the current is below $i_o$ and switchback is actually achieved. The requirement that the current be decreased to nearly zero for actual switchback restricts the circuit applications of the device and because of the broad switching current range is, of course, for certain applications inherently slow and consumes somewhat more power than is desirable. It would be desirable therefore to be able to increase the switchback current $i_o$ to higher values and to be able to predict that value. Second, the planar SIS structures utilized in the prior art are basically capacitive by nature. This intrinsic capacitance is ignored in the prior teachings, but when taken into account it is clear that it produces a characteristic capacitive time constant $\tau_c = C/G$. In order to increase switching speed it is desirable that $\tau_c$ be as small as possible. For a given structure with capacitance $C$, $\tau_c$ would therefore be decreased by increasing $G$, the total conductance of the junction. As mentioned previously, high conductance is inherent in SNS devices and therefore a lower capacitive time constant results. In addition, the switchback current may be raised to convenient and controllable values by appropriate choice of material and thickness of the normal metal interfacial region. It has been found that the switchback current is highly dependent on the value of the conductance of the normal metal layer. In fact, increasing $G$ increases the ratio of $i_o/i_J$ which in the limit approaches unity. Thus, in the case where $i_o$ is very nearly equal to $i_J$ it is possible to switch the device between the finite-voltage and zero-voltage states with an extremely small current "swing," with the effect that switching speed is increased and new circuit applications are admitted. The switching speed is further enhanced because an increased conductance $G$ decreases $\tau_c$ as previously pointed out. It should be noted that an increased $G$ has an opposite effect in that it increases the inherent inductive time constant $\tau_L$ =LG. But this drawback is readily alleviated since $L$ can be decreased by fabrication of the device on a superconducting ground plane by techniques well-known in the art.

In addition, AC effects analogous to the AC Josephson effect may be utilized to construct such devices as a pulse generator or parametric oscillator, as will be described more fully hereinafter.

BRIEF DESCRIPTION OF THE DRAWINGS

The invention, together with its various features and advantages, can be easily understood from the following more detailed description taken in conjunction with the accompanying drawings in which.

DETAILED DESCRIPTION

Figure 1:
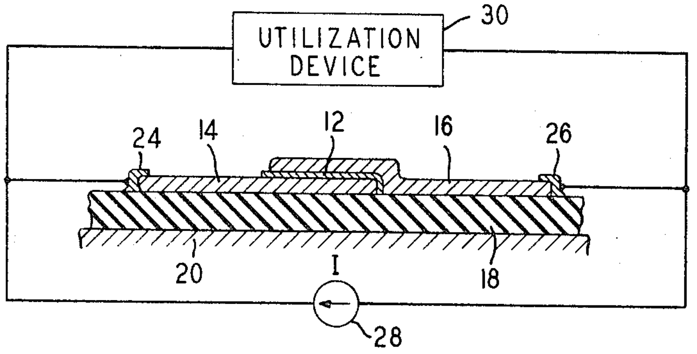
FIG. 1 is a schematic of a planar embodiment of the invention.

Turning now to FIG. 1, there is shown an illustrative embodiment of the invention comprising an SNS device formed in a planar structure by a thin normal metal layer 12 disposed between superconductors 14 and 16. The junction structure is fabricated on a dielectric substrate 18 which is deposited on a superconducting ground plane 20. Contacts 24 and 26 are provided to enable connection of the device to external circuitry such as current source 28 and load 30. The contact 24 makes electrical contact with superconductor 14 whereas contact 26 makes electrical contact with superconductor 16.

Typically the device is fabricated by depositing the layers in sequence upon the dielectric substrate 18 by techniques well-known in the art. For producing large supercurrents (e.g., $i_J \gtrsim 0.3$ma.) a normal metal layer 12 of the order of 500 Angstrom units thick is typical. A suitable SNS junction for the purposes of practicing the present invention is a lead-bismuth-lead junction. The basic requirement of the normal metal layer is that it remain normal (nonsuperconducting) at the operating temperature of the device. Typical normal metals include bismuth and copper of thickness preferably less than or equal to the electron coherence length as defined by equation (1).

Figure 2:
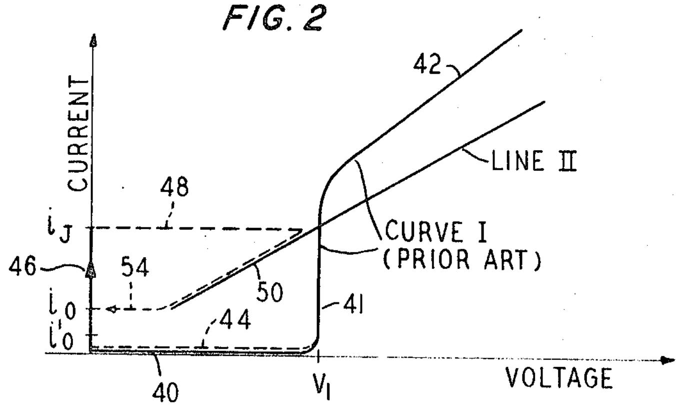
FIG. 2 is a graph of the $I$–$V$ characteristic of both the prior art Josephson devices and of the present invention.

The current-voltage characteristic of both the prior art and the present invention are shown in FIG. 2. The following discussion is directed to planar SNS junctions, but applies with only minor modifications to other supercurrent geometries as well. Curve I is the characteristic typical of prior art superconducting tunnel junctions in the finite-voltage state. As illustrated by line 40 the voltage increases rapidly with current until a voltage $V_1$ is reached at which point the current increases abruptly (line 41) for a small incremental increase in voltage. $V_1$ is typically 2.0 to 4.0 millivolts depending upon the materials used. At higher current levels, the current-voltage characteristic (line 42) is that of the tunnel junction when both superconductors 14 and 16 are in a normal (nonsuperconducting) state.

Curve I, however omits consideration of the D. C. Josephson effect which predicts that for a thin insulative layer in an SIS structure an additional supercurrent $i_J$ flows through the junction with no resultant voltage across the junction, as shown by line 46. The junction can carry only a limited supercurrent $i_J$, however, and above this first critical current the characteristic of the junction jumps (line 48) from line 46 to the usual current-voltage characteristic (line 42) with a corresponding increase in voltage across the junction from zero to $V_1$. In summary then, in the voltage transition from zero to $V_1$. In summary then, in the voltage transition from zero to $V_1$, a Josephson tunnel junction exhibits a current voltage characteristic as shown by the combination of lines 46, 48 and 42.

By way of contrast, the switchback characteristic from $V_1$ to zero, for decreasing current is shown by lines 41 and 44. As current is decreased the voltage does not abruptly decrease from $V_1$ along line 48 to zero. Rather, due to a hysteresis effect, the voltage remains nearly constant along line 41 until a second critical current $i_o'$, termed the switchback current, is reached. When the current is reduced below $i_o'$ the voltage rapidly decreases abruptly (line 44) to zero. The value of $i_o'$ in the prior art typically approaches zero. Since it is primarily the result of noise, it is characteristically random in value. The effect of $i_o'$ being nearly zero, as previously pointed out, is that a large current swing (i.e., from zero to $i_J$) is required to switch the device between the zero voltage and finite voltage ($V_1$) states.

In the SNS devices of the present invention, on the other hand, the current voltage characteristic (line II) is modified, particularly in the switchback region, in such a way that the switchback current $i_o$ is raised to convenient and controllable values, and simultaneously the switching speed is increased.

The forward current-voltage characteristic of the SNS devices of the present invention, as with the prior art, is characterized by lines 46, 48 and 42; that is, the device exhibits zero voltage at currents less than a first critical current $i_J$ and a finite higher voltage $V_1$ at currents above $i_J$. However, the characteristic above $V_1$ is shown by line 50 (not 42).

In the switchback region, however, the modification of the current-voltage characteristic is of primary importance to the improvement in operation of the SNS structure of the present invention over the Josephson tunnel junction. As the current is decreased from above $i_J$ the voltage follows the contour of line 50. Below $i_J$ the voltage decreases linearly along the portion of line 54 which is collinear with line 50, the latter having a slope $I/V=G$, the magnitude of the total conductance of the SNS structure. The voltage decreases to zero when the current is reduced below the switchback current $i_o$ which, depending on the value of $G$ (and other parameters), may be nearly equal to $i_J$.

Figure 3:
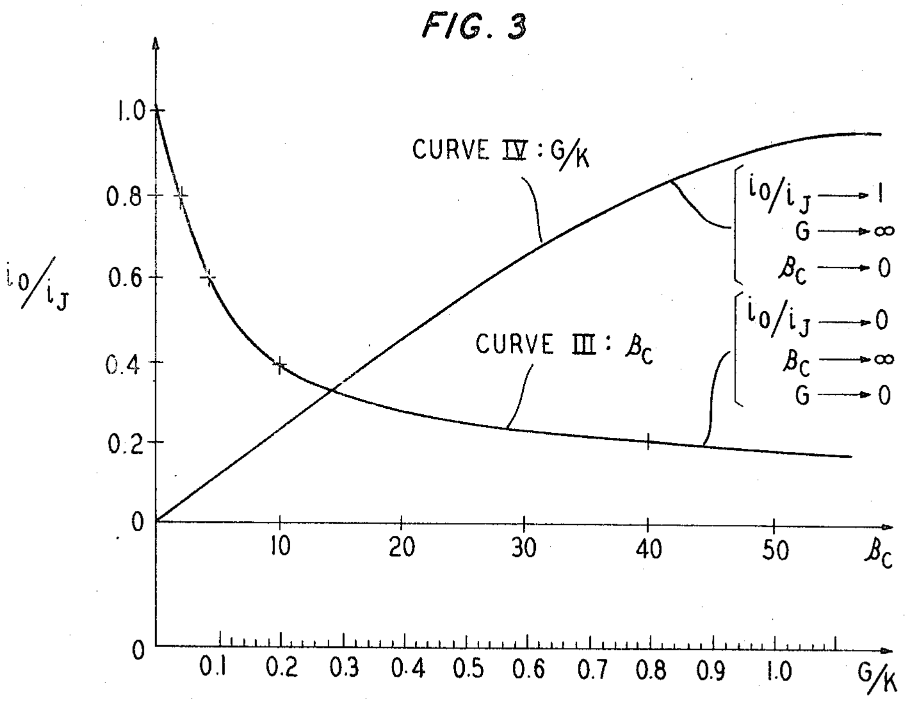
FIG. 3 is a graph showing the dependence of switchback current on conductance.

The relationship between $i_o$ and the magnitude of the conductance $G$ is shown in FIG. 3. The ratio $i_o/i_J$ is a function of the dimensionless ratio $\beta_c$ given by $$\beta_c = \frac{4\pi e i_J C}{hG^2} \quad (2)$$

where $C$ is the intrinsic capacitance of the SNS structure, $e$ is the electronic charge, and $h$ is Planck's constant. Curve III is a graph of $i_o/i_J$ versus $\beta_c$ and shows that $i_o/i_J=1$ at $\beta_c=0$ and that $i_o/i0J \rightarrow 0$ as $\beta_c \rightarrow \infty$. The latter limit is characteristic of the prior art SIS tunnel junctions; that is, typically $\beta_c \rightarrow \infty$(i.e., $G=0$ and consequently $i_o \rightarrow 0$ ($i_J$ being finite). By comparison, Curve IV is a graph of $i_o/i_J$ versus $G/K$ where $K^2$ is given by $$K^2 = \frac{4\pi e i_J C}{h} \quad (3)$$

Curve IV gives the same results as Curve III. Namely, that $i_o/i_J = 0$ at $G=0$ (the prior art), whereas for nonzero values of $G$ the value of $i_o/i_J$ ranges between 0 and 1. Thus, by proper choice of $G$ (i.e., by appropriate choice of material and thickness of the normal metal layer) the ratio $i_o/i_J$, and hence the value of $i_o$, can be fixed in accordance with predetermined design criteria. For example, it is desired with $i_o=0.8\ i_J$ then $G/K$ should be selected to be approximately 0.724.

It was mentioned earlier that increased total conductance $G$ advantageously decreased the capacitive time constant, but might disadvantageously increase the inductive time constant. This latter effect is reduced by fabricating the SNS structure on an insulated superconducting ground plane (i.e., on ground plane 20 insulated by dielectric 18 as shown in FIG. 1). The ground plane being substantially impermeable to flux lines effectively reduces any inductance associated with the circuit leads.

LOGIC and SWITCHING DEVICES

The present invention may operate as a variety of logic devices including AND and OR gates, a pulse generator or a simple ON-OFF switch. In the latter case, with reference to FIG. 1 again, the switch is turned ON (zero voltage) when the current $I$ of source 28 is in the range $0 \leq I < i_J$. The switch is turned OFF (finite voltage $V_1$) when $I \geq i_J$. To turn the switch back ON, the current of source 28 is reduced below the switchback current $i_o$, thus completing the cycle.

Figure 4:
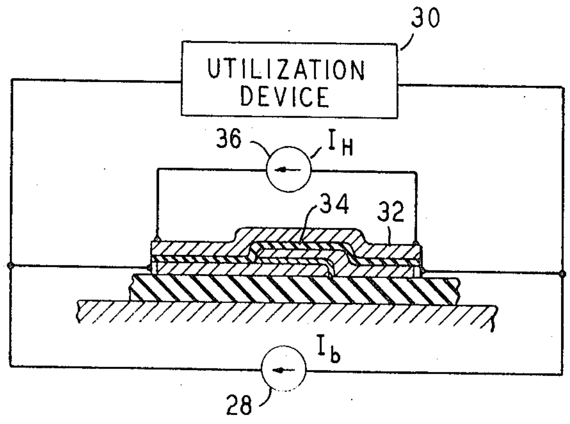
FIG. 4 is a schematic of another planar embodiment of the invention utilizing magnetic switching.

The present invention lends itself readily to a magnetically controlled switch. The basic structure of the device as shown in FIG. 4 is substantially identical to that of FIG. 1 with the addition of a magnetic control film 32 deposited over the SNS structure, but separated therefrom by an insulative layer 34. A variable control current source 36 is connected across the control film in order to generate a magnetic field in the junction.

Figure 5A:
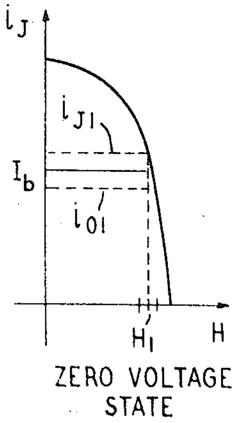
FIGS. 5A, 5B and 5C are graphs of $i_J$ versus magnetic field showing the various states of the switch of FIG. 4.
Figure 6:
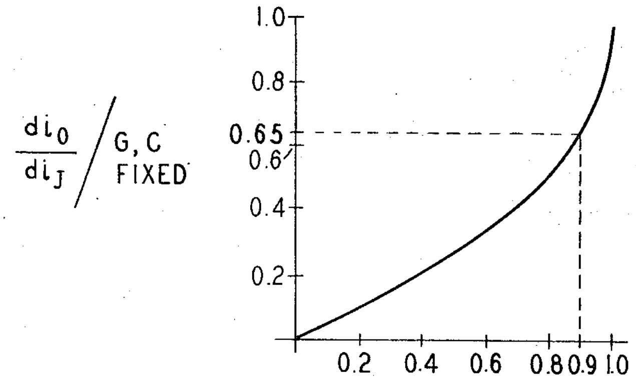
FIG. 6 is a graph showing the differential changes in $i_o$ corresponding to differential changes in $i_J$.

The operation of the device utilizes the dependence of both the supercurrent $i_J$ and the switchback current $i_o$ on the applied magnetic field $H$. That dependence is shown in part in FIG. 5A which indicates that $i_J$ decreases with increasing $H$. (For a more detailed discussion, see U.S. Pat. No. 3,281,609, especially with reference to FIG. 3 therein). The switchback current also decreases with increasing magnetic field, but as shown in FIG. 6 generally the differential change $di_o$ is smaller than the corresponding differential change $di_J$. For example, suppose $i_o/i_J$ 0.9, then an applied field which changes $i_J$ by an amount $di_J$ would produce a corresponding change in $i_o$ by a smaller amount $di_o$0.65 $di_J$.

Figure 5B:
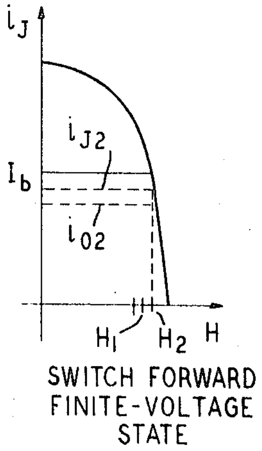
Figure 5C:
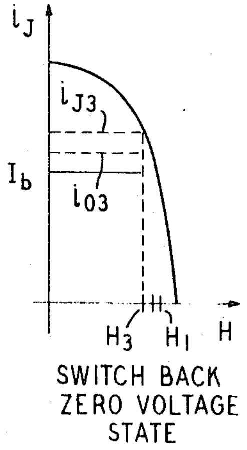

The aforementioned relationships are utilized in the present invention to provide magnetic switching while maintaining a constant current $I_b$ through the junction. Referring to FIG. 5A, consider initially that the magnetic intensity $H=H_1$ is chosen such that $i_{o1} < I_b < i_{J1}$. The switch would therefore be in a zero-voltage state. When the field is increased to $H=H_2$ (i.e., $I_H$ is increased), both the supercurrent $i_J$and the switchback current $i_o$ decrease such that $i_{02} < i_{J2} < I_b$ (FIG. 5B). Consequently, the device switches forward to a finite-voltage state. On the other hand, when the field is reduced to $H=H_3$, the supercurrent and switchback currents both increase such that $I_b < i_{03} < i_{J3}$ (FIG. 5C). The device therefore switches back to the zero-voltage state and completes the switching cycle.

It is clear, therefore, that to reduce the range of control current required to switch the device, it is preferable that $i_o$ and $i_J$ be maintained as nearly equal as is practically possible.

The aforementioned operation, though analogous to the magnetically controlled switch of U.S. Pat. No. 3,281,609, is different in one important respect; namely, in that device, as well as in similar prior art devices, the switchback current is very nearly zero. Consequently, while the switch-forward step is possible (FIG. 5B), the switchback step is not, because there is insufficient variation in $i_o$ and $i_J$ with changes in $H$ to be able to both reduce $i_J$ below $i_b$ (FIG. 5B) and also to increase $i_o$ above $I_b$ (FIG. 5C).

ALTERNATIVE GEOMETRY

Figure 7:
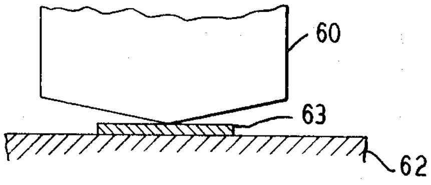
FIG. 7 is a schematic of a point contact embodiment of the invention.

An alternative geometrical configuration embodying the principles of the present invention is shown in FIG. 7, the external circuitry having been omitted for clarity.

A point contact embodiment is shown in FIG. 7 comprising a tapered superconducting element 60 making contact with a planar normal metal layer 63 deposited on planar superconductor 62. The surfaces of superconductor 62 or normal metal layer 63 may be curved, however, if so desired. The taper of element 60 may be one-dimensional only, so defining a wedge, or may be two-dimensional, so defining a point. RF Devices The foregoing discussion was concerned primarily with the DC properties of the SNS devices which are analogous to the DC properties of Josephson tunnel junctions. In addition, however, the SNS structure possesses RF characteristics similar to those of the Josephson tunnel junction which make it useful as an oscillator or pulse generator. These RF properties exist simultaneously with the DC properties and may be exploited if the device is situated in an appropriate microwave environment (e.g., a cavity resonator).

The SNS device of FIG. 1, for example, which is driven by a DC current source such that $I > i_J$, generates a pulse train having pulse width $hG/2eI$and pulse repetition rate $2e\ V_{ave}/h$, where $V$ is the magnitude of the driving voltage and $V_{ave}$ is the average value of the voltage $V$. Typical frequencies range from 1 to 5000 gigahertz at 1 microvolt.

Figure 8:
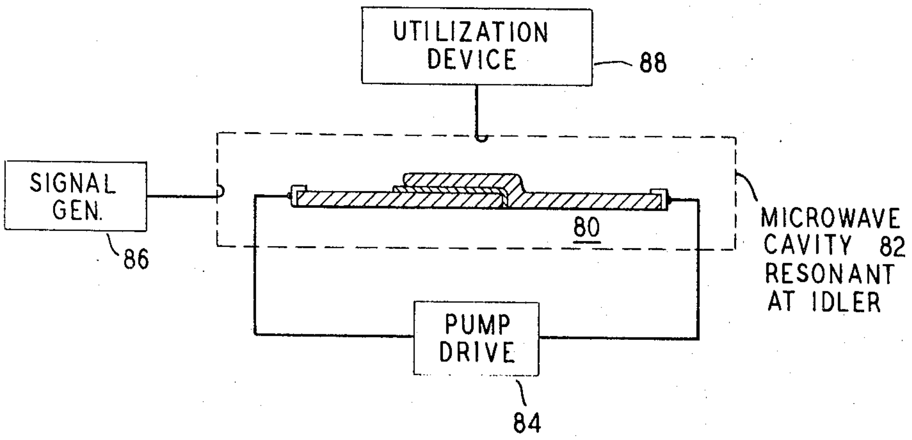
FIG. 8 is a schematic of a parametric device in accordance with the principles of the invention.

As shown in FIG. 8, such an oscillator may be used as a parametric device. The SNS structure 80, disposed in a microwave cavity 82 resonant at an idler frequency $f_i$, is driven by a pump source 84 (current or voltage source) so as to generate pump radiation of frequency $f_p$. A signal generator 86 is coupled to the cavity 82 so as to generate therein signal radiation of frequency $f_s$. A utilization device 88 is also coupled to the cavity 82 so as to extract therefrom output radiation at the idler frequency. To operate as a parametric device the pump source is adjusted so as to generate pump radiation which satisfies the criterion that $f_p=f_s+f_i$ as is well known in the art.

It is to be understood that the above-described arrangements are merely illustrative of the many possible specific embodiments which can be devised to represent application of the principles of the invention. Numerous and varied other arrangements can be devised in accordance with these principles by those skilled in the art without departing from the spirit and scope of the invention.

I claim:

1. A supercurrent junction device comprising:

a pair of superconductors;

a normal metal separating and in electrical contact with said superconductors thereby forming a junction, said junction having a hysteretic current voltage characteristic including a region of increasing current at zero voltage and a first critical supercurrent at which said junction voltage abruptly increases from the zero voltage to some finite higher value, and including a region of decreasing current less than the first critical current in which the junction voltage decreases and a second critical supercurrent, less than the first critical supercurrent, at which the junction voltage is again zero, and means for applying to said junction current, the amplitude of which is variable from greater than the first critical super current to less than the second critical supercurrent.

2. The device of claim 1 wherein the thickness of said normal metal in the dimension separating said superconductors is less than or equal to the electron coherence length.

3. The device of claim 1 wherein said superconductor and said normal metal are planar thin films.

4. The device of claim 1 wherein at least one of said superconductors has a tapered region defining a small cross-sectional area in the vicinity of said junction and said normal metal is contiguous with the small cross-sectional area of said superconductor.

5. The device of claim 4 wherein said tapered region is one-dimensional defining a wedge.

6. The device of claim 4 wherein said tapered region is two-dimensional defining a point.

7. A supercurrent junction device comprising:

a pair of superconductors;

a normal metal separating and in electrical contact with said superconductors thereby forming a junction, said junction having a hysteretic current voltage characteristic including a region of increasing current at zero voltage and a first critical supercurrent at which said junction voltage abruptly increases from the zero voltage to some finite higher value, and including a region of decreasing current less than the first critical current in which the junction voltage decreases and a second critical supercurrent, less than the first critical supercurrent, at which the junction voltage is again zero;

means for applying a fixed bias current to said junction; and means for applying to said junction a variable magnetic field such that an increase in the magnitude of the field reduces the first critical current below the fixed bias current thereby to increase the voltage of said junction from zero voltage to the finite higher value, and such that a decrease in the magnitude of the field increases the second critical current above the fixed bias value thereby to decrease the voltage of said junction to zero voltage again.

8. The device of claim 7 wherein the thickness of said normal metal in the dimension separating said superconductors is less than or equal to the electron coherence length.

9. A supercurrent junction device for use as an oscillator comprising:

a pair of superconductors;

a normal metal separating and in electrical contact with said superconductors thereby forming a junction, said junction having a hysteretic current voltage characteristic including a region of increasing current at zero voltage and a first critical supercurrent at which said junction voltage abruptly increases from the zero voltage to some finite higher value, and including a region of decreasing current less than the first critical current in which the junction voltage decreases and a second critical supercurrent, less than the first critical supercurrent, at which the junction voltage is again zero;

means generating oscillatory radiation of frequency $$f_p=\frac{2eV}{h}$$

where $e$ is electronic charge and $h$ is Planck's constant, comprising means for applying across said junction a voltage of magnitude $V$; and means enclosing said device for coupling the oscillatory radiation to an output device.

10. The device of claim 9 for use as a parametric oscillator wherein said enclosing means comprises:

a cavity resonator tuned to an idler frequency $f_i$, said resonator including therein said device;

means for coupling to said resonator signal radiation of frequency $f_s$; and means for coupling idler radiation from said resonator, and wherein the magnitude of the voltage applied across said junction is adjusted such that $f_p=f_s+f$.

11. The device of claim 9 wherein the thickness of said normal metal in the dimension separating said superconductors is less than or equal to the electron coherence length.

12. A supercurrent junction device for use as an oscillator comprising:

a pair of superconductors;

a normal metal separating and in electrical contact with said superconductors thereby forming a junction, said junction having a hysteretic current voltage characteristic including a region of increasing current at zero voltage and a first critical supercurrent at which said junction voltage abruptly increases from the zero voltage to some finite higher value, and including a region of decreasing current less than the first critical current in which the junction voltage decreases and a second critical supercurrent, less than the first critical supercurrent, at which the junction voltage is again zero;

means for generating oscillatory radiation of frequency $$f_p=\frac{2eI}{hG}$$

where $e$ is electronic charge, $h$ is Planck's constant and $G$ is the total conductance of said device, comprising means for applying to said junction a current of magnitude $I$ greater than the first critical supercurrent; and means enclosing said device for coupling the oscillatory radiation to an output device.

13. The device of claim 12 for use as a parametric oscillator wherein said enclosing means comprises:

a cavity resonator tuned to an idler frequency $f_i$, said resonator including said device;

means for coupling to said resonator signal radiation of frequency $f_s$; and means for coupling idler radiation from said resonator, and wherein the magnitude of the current applied to said junction is adjusted such that $f_p=f_s+f_i$.

14. The device of claim 13 wherein the thickness of said normal metal in the dimension separating said superconductors is less than or equal to the electron coherence length.